US009058610B2

(12) United States Patent
Gharavy

(10) Patent No.: US 9,058,610 B2
(45) Date of Patent: Jun. 16, 2015

(54) METHOD AND APPARATUS FOR PERFORMING COLLECTIVE VALIDATION OF CREDENTIAL INFORMATION

(75) Inventor: Shari Gharavy, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 0 days.

(21) Appl. No.: 13/022,069

(22) Filed: Feb. 7, 2011

(65) Prior Publication Data

US 2011/0131137 A1    Jun. 2, 2011

Related U.S. Application Data

(63) Continuation of application No. 09/896,144, filed on Jun. 29, 2001, now Pat. No. 7,904,326.

(51) Int. Cl.
G06F 7/00 (2006.01)
G06Q 30/02 (2012.01)
(Continued)

(52) U.S. Cl.
CPC ............ *G06Q 30/02* (2013.01); *G06Q 10/0637* (2013.01); *G06Q 10/06398* (2013.01); *G06Q 20/40* (2013.01); *G06Q 30/018* (2013.01); *G06Q 40/12* (2013.12)

(58) Field of Classification Search
USPC ............ 705/7, 10, 30, 38, 44, 2, 26.1, 28, 34, 705/35, 40, 317, 318; 713/2–7; 235/376, 235/379, 382, 383; 726/2–7
See application file for complete search history.

(56) References Cited

U.S. PATENT DOCUMENTS 5,195,178 A   3/1993  Krieger et al.
5,523,942 A   6/1996  Tyler et al.
(Continued)

FOREIGN PATENT DOCUMENTS

WO    0205367 A2    1/2002

OTHER PUBLICATIONS

Restriction Requirement dated Mar. 22, 2004 mailed in parent U.S. Appl. No. 09/896,144, 5 pgs.
(Continued)

*Primary Examiner* — Andrew Joseph Rudy

(57) ABSTRACT

An embodiment of the invention comprises a method and apparatus for performing collective validation of credential information. The invention has applicability in industries that require sales agents or those related to the distribution of a certain product to be credentialed (e.g., licensed and/or appointed) when selling certain products (e.g., life insurance, etc. . . . ). For example, in order to sell some financial instruments sales representatives must meet state and/or federal licensing requirements. Embodiments of the invention provide a way to ensure that sales representatives operate within any regulatory constraints put in place by government or any other organization. Companies may, for instance, utilize embodiments of the invention to ensure that sales representatives operate within a set of defined constraints. One aspect of the invention provides a method for validating sales agents' credentials while processing the sales transaction data to determine commission amounts. The system is configured to perform such transaction processing in an efficient manner that minimizes the amount of computational resources required to determine whether a sales agent has valid credential at the time of a particular sale and is therefore entitled to compensation (e.g., a commission) for the sale.

45 Claims, 5 Drawing Sheets

(51) Int. Cl.
*G06Q 10/06* (2012.01)
*G06Q 20/40* (2012.01)
*G06Q 30/00* (2012.01)
*G06Q 40/00* (2012.01)

(56) References Cited

U.S. PATENT DOCUMENTS

| | | | |
|---|---|---|---|
| 5,732,263 | A | 3/1998 | Havens et al. |
| 5,832,268 | A | 11/1998 | Anderson et al. |
| 5,895,459 | A | 4/1999 | Enomoto |
| 5,905,715 | A | 5/1999 | Azarmi et al. |
| 5,937,410 | A | 8/1999 | Shen |
| 6,067,531 | A | 5/2000 | Hoyt et al. |
| 6,219,652 | B1 | 4/2001 | Carter et al. |
| 6,334,111 | B1 | 12/2001 | Carrott |
| 6,606,744 | B1 * | 8/2003 | Mikurak ................ 717/174 |
| 6,609,123 | B1 | 8/2003 | Cazemier et al. |
| 6,618,732 | B1 | 9/2003 | White et al. |
| 6,636,867 | B2 | 10/2003 | Robertson |
| 6,662,164 | B1 * | 12/2003 | Koppelman et al. ....... 705/14.13 |
| 6,662,188 | B1 | 12/2003 | Rasmussen et al. |
| 6,671,818 | B1 * | 12/2003 | Mikurak ................ 714/4.21 |
| 6,745,168 | B1 | 6/2004 | Enomoto |
| 6,775,674 | B1 | 8/2004 | Agassi |
| 6,789,054 | B1 | 9/2004 | Makhlouf |
| 6,944,514 | B1 | 9/2005 | Matheson |
| 6,952,660 | B1 | 10/2005 | Matheson |
| 6,957,220 | B2 | 10/2005 | Lamkin et al. |
| 6,965,868 | B1 | 11/2005 | Bednarek |
| 6,983,261 | B1 | 1/2006 | Francisco et al. |
| 7,003,486 | B1 | 2/2006 | Condamoor et al. |
| 7,107,239 | B2 | 9/2006 | Graff |
| 7,240,017 | B2 | 7/2007 | Labelle et al. |
| 7,249,075 | B1 | 7/2007 | Altomare et al. |
| 7,383,233 | B1 | 6/2008 | Singh et al. |
| 7,428,726 | B1 | 9/2008 | Cowan et al. |
| 7,469,214 | B2 * | 12/2008 | Martin et al. ................ 705/4 |
| 7,496,525 | B1 | 2/2009 | Mitchell |
| 7,500,272 | B2 | 3/2009 | Wheeler et al. |
| 7,574,329 | B1 | 8/2009 | Matheson |
| 7,672,904 | B2 | 3/2010 | Powell |
| 7,685,053 | B2 | 3/2010 | Graff |
| 7,765,161 | B2 * | 7/2010 | McKenney et al. ............ 705/64 |
| 7,769,679 | B2 * | 8/2010 | Skuriat et al. ................... 705/37 |
| 7,831,478 | B2 | 11/2010 | Harris |
| 7,840,498 | B2 | 11/2010 | Frank et al. |
| 7,844,835 | B2 * | 11/2010 | Ginter et al. .................. 713/193 |
| 7,925,513 | B2 * | 4/2011 | Chao et al. .................. 705/7.11 |
| 7,958,024 | B2 * | 6/2011 | Chao et al. ....................... 705/35 |
| 8,121,871 | B2 | 2/2012 | Young, III et al. |
| 8,494,904 | B2 * | 7/2013 | Shkedi .......................... 705/14.4 |
| 8,626,636 | B2 | 1/2014 | Sauter et al. |
| 2001/0047282 | A1 | 11/2001 | Raveis, Jr. |
| 2002/0019889 | A1 | 2/2002 | Enomoto |
| 2002/0055850 | A1 | 5/2002 | Powell et al. |
| 2002/0120476 | A1 | 8/2002 | Labelle et al. |
| 2002/0152118 | A1 | 10/2002 | Hadjigeorgis |
| 2002/0156688 | A1 | 10/2002 | Horn et al. |
| 2003/0036683 | A1 | 2/2003 | Kehr et al. |
| 2003/0120611 | A1 | 6/2003 | Yoshino et al. |
| 2003/0154121 | A1 | 8/2003 | Konnersman |
| 2004/0078305 | A1 | 4/2004 | Weller |
| 2007/0129972 | A1 | 6/2007 | Labelle et al. |
| 2007/0225999 | A1 | 9/2007 | Powell et al. |
| 2011/0231197 | A1 | 9/2011 | Chao et al. |

OTHER PUBLICATIONS

Response to Restriction Requirement dated Apr. 20, 2004, as filed in the parent U.S. Appl. No. 09/896,144 on Apr. 20, 2004, 2 pgs.
Non-Final Office Action dated Jun. 8, 2004 mailed in parent U.S. Appl. No. 09/896,144, 12 pgs.
Response to Non-Final Office Action dated Jun. 8, 2004, as filed in the parent U.S. Appl. No. 09/896,144 on Dec. 13, 2005, 18 pgs.
Final Office Action dated Mar. 11, 2005 mailed in parent U.S. Appl. No. 09/896,144, 8 pgs.
Request for Continued Examination filed with RCE submission, as filed in the parent U.S. Appl. No. 09/896,144 on Sep. 12, 2005, 21 pgs.
Restriction Requirement dated Nov. 25, 2005 mailed in parent U.S. Appl. No. 09/896,144, 6 pgs.
Response to Restriction Requirement dated Nov. 25, 2005, as filed in the parent U.S. Appl. No. 09/896,144 on Dec. 22, 2005, 2 pgs.
Restriction Requirement dated Mar. 6, 2006 mailed in parent U.S. Appl. No. 09/896,144, 4 pgs.
Response to Restriction Requirement dated Mar. 6, 2006, as filed in the parent U.S. Appl. No. 09/896,144 on May 11, 2006, 1 pgs.
Non-Final Office Action dated Jul. 7, 2006 mailed in parent U.S. Appl. No. 09/896,144, 9 pgs.
Response to Non-Final Office Action dated Jul. 7, 2006, as filed in the parent U.S. Appl. No. 09/896,144 on Dec. 7, 2006, 15 pgs.
Non-Final Office Action dated Mar. 12, 2007 mailed in parent U.S. Appl. No. 09/896,144, 10 pgs.
Response to Non-Final Office Action dated Mar. 12, 2007, as filed in the parent U.S. Appl. No. 09/896,144 on Aug. 13, 2007, 20 pgs.
Final Office Action dated Dec. 5, 2007 mailed in parent U.S. Appl. No. 09/896,144, 10 pgs.
Request for Continued Examination filed with RCE submission, as filed in the parent U.S. Appl. No. 09/896,144 on Jun. 3, 2008, 19 pgs.
Non-Final Office Action dated Jun. 11, 2008 mailed in parent U.S. Appl. No. 09/896,144, 8 pgs.
Response to Non-Final Office Action dated Jun. 11, 2008, as filed in the parent U.S. Appl. No. 09/896,144 on Nov. 12, 2008, 16 pgs.
Miscellaneous Action dated Feb. 12, 2009 mailed in parent U.S. Appl. No. 09/896,144, 4 pgs.
Response to Miscellaneous Action dated Feb. 12, 2009, as filed in the parent U.S. Appl. No. 09/896,144 on May 12, 2009, 18 pgs.
Notice of Allowance dated Nov. 10, 2009 mailed in parent U.S. Appl. No. 09/896,144, 16 pgs.
Request for Continued Examination, as filed in the parent U.S. Appl. No. 09/896,144 on Nov. 10, 2009, 3 pgs.
Notice of Allowance dated Nov. 23, 2009 mailed in parent U.S. Appl. No. 09/896,144, 8 pgs.
Request for Continued Examination, as filed in the parent U.S. Appl. No. 09/896,144 on Feb. 23, 2010, 3 pgs.
Notice of Allowance dated Mar. 24, 2010 mailed in parent U.S. Appl. No. 09/896,144, 8 pgs.
Request for Continued Examination, as filed in the parent U.S. Appl. No. 09/896,144 on Jun. 24, 2010, 3 pgs.
Notice of Allowance dated Jul. 21, 2010 mailed in parent U.S. Appl. No. 09/896,144, 8 pgs.
Request for Continued Examination, as filed in the parent U.S. Appl. No. 09/896,144 on Oct. 15, 2010, 3 pgs.
Notice of Allowance dated Nov. 16, 2010 mailed in parent U.S. Appl. No. 09/896,144, 12 pgs.
Sales misconduct may spark 'excessive' new regs, Frederick Schmitt. National Underwriter. Mar. 24, 1997. pp. 1-2.
Marketing and regulatory trends that will affect sales compensation, John M Wellborn, Paul O LaPorte, Journal of Financial Service Professionals. Nov. 2000. pp. 1-5.

* cited by examiner

METHOD AND APPARATUS FOR PERFORMING COLLECTIVE VALIDATION OF CREDENTIAL INFORMATION

CROSS-REFERENCE TO RELATED APPLICATIONS

This application is a continuation of application Ser. No. 09/896,144, filed Jun. 29, 2001, now U.S. Pat. No. 7,904,326 which is incorporated herein by reference in its entirety.

FIELD OF THE INVENTION

This invention relates to the field of computer technology. More specifically, the invention relates to a method and system for performing collective validation of credential information (e.g., license and/or appointment data).

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyrights whatsoever.

BACKGROUND

There are many complexities to the financial services business. At any given time large amounts of sales transaction data must be organized and processed. Such data may relate to many types of sales transactions and much of it is necessary to keep the business running smoothly. Some of the more significant classifications of sales transaction data stem from the fact that in the financial services business there are multiple distribution channels each with multiple distributors and many different incentive plans for employees. In most instances, these incentive plans are constantly modified and changed. This is particularly true in the financial services sector where distributors and sales representatives may require certain licenses and appointments in order to legally sell certain financial instruments. The status of the license or appointment data changes continuously and must therefore be updated on a regular basis. Furthermore, the volume of sales transactions is large, and for each transaction a number of tests must carried out to validate the sales agents' credentials and compute the compensation amounts associated with the sales transactions.

Updating such a large amount of records is a cumbersome process that can require significant system resources. Thus, systems must be configured to efficiently validate sales transactions in view of the licenses and/or appointments necessary to legally complete the transaction. Existing systems do not currently have a mechanism for processing such data in a way that minimizes the time required to process license and appointment data and validate a sales agent's credentials before distributing compensation to the sales agent for the transaction. Therefore there is a need for an improved mechanism for processing sales transaction data.

SUMMARY OF THE INVENTION

An embodiment of the invention comprises a method and apparatus for performing collective validation of credential information. The invention has applicability in industries that require sales agents or those related to the distribution of a certain product to be credentialed (e.g., licensed and/or appointed) when selling certain products (e.g., life insurance, etc. . . . ). For example, in order to sell some financial instruments sales representatives must meet state and/or federal licensing requirements. Embodiments of the invention provide a way to ensure that sales representatives operate within any regulatory constraints put in place by government or any other organization. Companies may, for instance, utilize embodiments of the invention to ensure that sales representatives operate within a set of defined constraints.

One aspect of the invention provides a method for validating sales agents' credentials while processing the sales transaction data to determine commission amounts. The system is configured to perform such transaction processing in an efficient manner that minimizes the amount of computational resources required to determine whether a sales agent has valid credential at the time of a particular sale and is therefore entitled to compensation (e.g., a commission) for the sale. The system may process one or more transactions at a time and may perform transaction processing collectively if such processing is desirable.

In an embodiment of the invention, the compensation engine or some other software component determines the grouping of input such that validation can be performed collectively (e.g., in batch). For instance, the compensation engine may perform an initialization process where it obtains credential information that relates to the sales agents and assembles the credential information into a denormalized table. The system may obtain credential information (e.g., licensing and/or appointment data) from several tables of a database and put the credential information into a single denormalized table. The system may also load rule information that can be utilized to process the credential information. This rule information may be provided to the system in any structured form (e.g., text, XML, etc. . . . ) and the rule data may comprise a set of tests for determining if a particular transaction was valid. In one embodiment of the invention, the system instantiates an instance of an object oriented class referred to as the RuleSet class. The RuleSet class and a set of associated object reachable from that class (e.g., preconditions, test, etc. . . . ) provide the functionality referred to as the rule engine. Thus, the rule engine may comprise a collection of objects working together. However, the invention also contemplates other software or hardware mechanisms configured to provide rule engine functionality. The objected oriented examples provided herein are for illustrative purposes and the reader should note that other non-objected oriented programs may be configured to provide the functionality described herein.

Once the rule information is loaded, an embodiment of the invention utilizes the rule information to determine if the distributor (e.g., sales agent) specified in the transaction was properly credited. Thus, the system obtains a set of transactions (e.g., a batch) associated with one or more sales agents and utilizes the transaction data to determine if a commission amount associated with each transaction may be credited to one or more of the sales agent's accounts. Compensation is distributed when the constraints placed on the sales transaction are satisfied. For example, a sales representative that made a sale under an invalid credential (e.g., a license or appointment) will not be compensated for the sales. Thus, part of the compensation process involves determining the validity of the sales agent's credentials (e.g., license and/or appointment data).

In one embodiment of the invention, the process associated with determining whether the credential data is valid involves converting each transaction to input usable by the rule engine. A collective set of rule engine input may then be provided to the system to perform validation. The process of determining whether the transaction input is valid may involve determining the set of rules that apply to the input by filtering the rules using a set of preconditions. The set of tests may then be partitioned by test type and each test type is associated with the transaction input. Once the association occurs a candidate for each test type is selected and a collective group of the tests of a particular type is formulated. The group of tests is then input to the system for processing. The reader should note, however, that the invention does not require that such test data be input collectively (e.g., in batch). The test data (e.g., tests of a particular type) may also be input individually or in any other categorical methodology that provides the test data to the system. The results can be stored in cache for later use by the system.

For each rule associated with each input, the system determines if the test conditions are met. If the test conditions are met, the transaction data with respect to that test type is considered valid. The system may use the cached results to determine if the test conditions are met. The results indicate which of the transactions are valid and can therefore be utilized to determine which sales agents to compensation for a particular transaction.

In an embodiment of the invention, the functionality is accomplished through the use of a set of software and/or hardware components configured to determine whether a sales transaction should result in a credit to the sales agent associated with the transaction. The system may perform this by utilizing a compensation engine configured to communicate with the rule engine. In one embodiment of the invention, the rule engine comprises a collection of software interrelated components.

DETAILED DESCRIPTION

Figure 1:
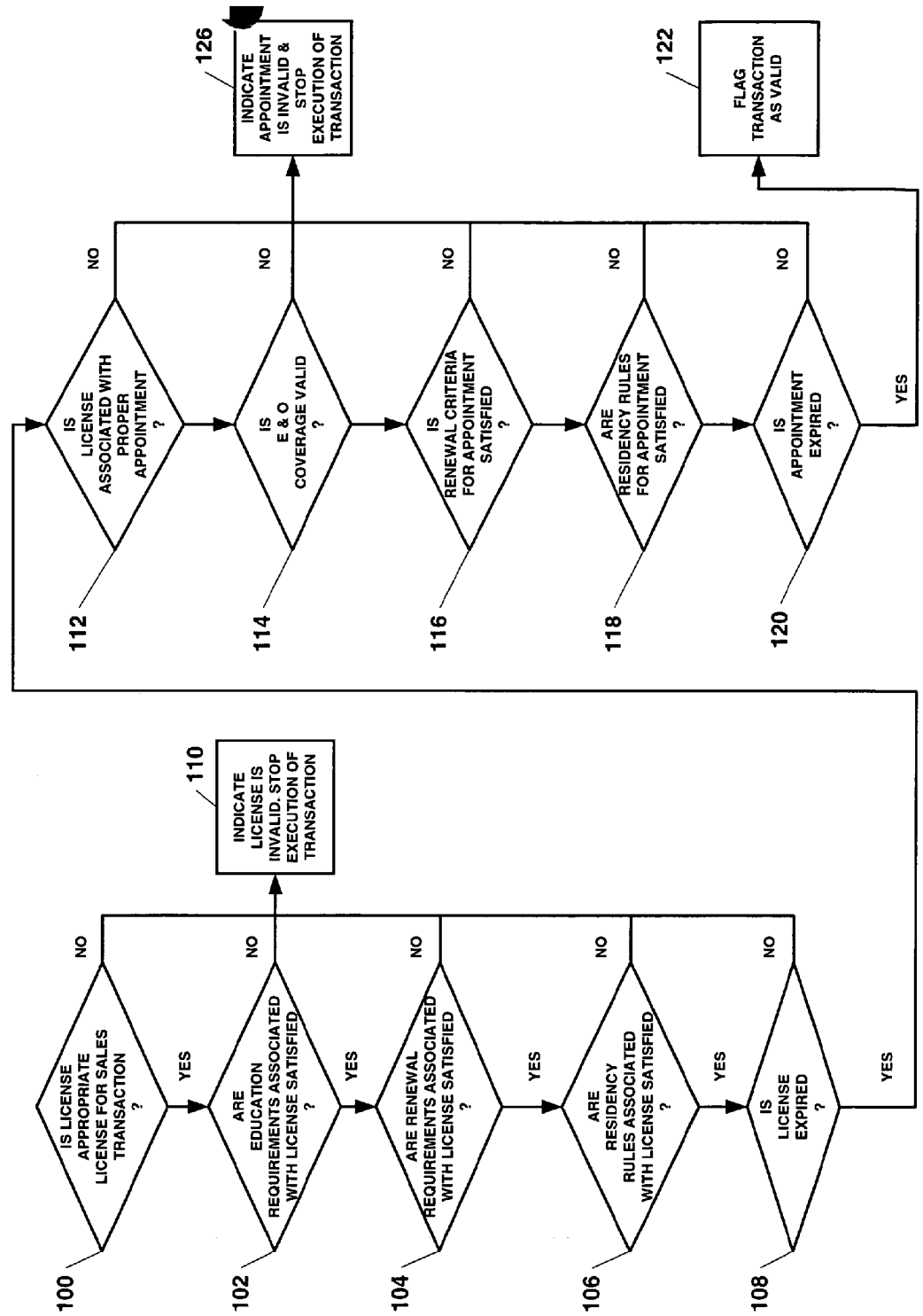
FIG. 1 shows a flowchart of the steps in an example that illustrates the validity checks of credentials according to an embodiment of the invention.

The invention provides a method and apparatus for performing collective validation of credential information. In the following description, numerous specific details are set forth in order to provide a more thorough understanding of the invention. It will be apparent, however, to one skilled in the art, that the invention may be practiced without these specific details. In other instances, well-known features have not been described in detail in order to avoid unnecessarily obscuring the invention.

System Overview:

An embodiment of the invention comprises a method and apparatus for performing collective validation of credential information (e.g., license and/or appointment data or any other set of constraints upon a sales transaction). More specifically, the invention provides a method for validating sales agents' credentials while processing sales transaction data to determine commissions to be paid. The system is configured to perform such transaction processing in a manner that decreases the amount of time and resources required to determine whether a sales agent has a valid credential at the time of a particular sale and is therefore entitled to compensation (e.g., a commission) for the sale. The system may process one or more transactions at a time and may perform transaction processing collectively if such processing is desirable. The specifics of the improved system for processing such transaction data will be described in further detail below.

The invention may be integrated into an extensible system for managing relationships between institutions (e.g., suppliers/manufacturers) of a product or service and the distributors (e.g., sales representatives) of their product. Systems embodying the invention have applicability in industries that require sales agents or those related to the distribution of a certain product or service to be credentialed (e.g., licensed or appointed) in order to sell the product. For example, in order to sell a certain financial instrument a sales representative might be required to have a state and/or federal license to sell that type of financial instrument.

Companies or organizations may utilize the invention to enforce agreements the company has with distributors who sell their products. Thus, the system may enforce an agreement stating that all sales transactions are to be performed by sales representatives or distributors who have valid credentials. This provides organizations such as life insurances companies a way to manage the sale and distribution of life insurance plans in a way that coincides with the regulatory constraints of government organizations. Whether a particular distributor or sales representative is appropriately credentialed can be viewed as a regulatory constraint. The system ensures that such regulatory constraints are not violated when a transaction is executed. Although, licenses and/or appointments are utilized as examples of the types of credentials that may be validated by embodiments of the invention, the term credentials as it utilized encompasses any set of constraints or requirements associated with a sales transaction. For instance, company policies or individual constraints that vary on a product by product basis, or any other set of definable constraints can also be enforced by the system by implementing such items as "credentials" that may be required for a sales representative to be compensated. Transactions that do not conform to the government regulations are not typically executed and may not therefore result in any compensation to the sales representative(s) or distributor(s) associated with the transaction. In accordance with one embodiment of the invention, credential checks are collectively submitted to the system for processing. This decreases the time and resources required to process the credential information.

The invention may use multiple techniques for processing the sales transaction data in order to determine whether a sales agent has valid credential at the time of a particular sale and is therefore entitled to compensation (e.g., a commission) for the sale. In an embodiment of the invention, a compensation engine or some other software component determines an arrangement of input such that validation can be performed collectively (e.g., in batch). For example, the compensation engine may perform an initialization process where it obtains credential information that relates to the sales agents and assemble the credential information into a denormalized table. For instance, the system may obtain credential information (e.g., licensing and/or appointment information) from several database tables and put the credential information into a single denormalized table. The initialization engine may also load rule information that can be utilized to process the credential information. This rule information may be provided to the system in any structured form (e.g., text, XML, etc. . . . ) and the rule data may comprise a set of tests for determining if a particular transaction was valid.

In one embodiment of the invention, the system instantiates an instance of an object oriented class referred to as the RuleSet class. The RuleSet class and a set of associated object reachable from that class (e.g., preconditions, test, etc. . . . ) provide the functionality referred to as the rule engine. Thus, the rule engine may comprise a collection of objects working together. For instance, the system may interact with a RuleSet instance through a rule container class or some other type of interface (e.g., a license and appointment class). Upon initialization, a RuleSetImporter may be utilized to obtain the rule information (e.g., XML files that define the rules) and create an in memory representation of the imported rules. That representation may comprise a chain of RuleSet objects and their associated preconditions and tests. The reader should note that the specific classes and objects referred to herein are for illustrative purposes. Other non-objected oriented programs may be configured to provide the same functionality.

Once the rule information is loaded (e.g., via the RuleSetImporter or some other mechanism), an embodiment of the invention utilizes the rule information to determine if the distributor (e.g., sales agent) specified in the transaction was properly credited. Thus, the system obtains a set of transactions (e.g., a batch) associated with one or more sales parties and utilizes the transaction data to determine if a commission amount associated with each transaction should be credited. Compensation is distributed when the constraints placed on the sales transaction are satisfied. For example, a sales representative that made a sale under an invalid credential (e.g., license or policy) will not be compensated for the sales. Thus, part of the compensation process involves determining the validity of the sales agent's credentials (e.g., license and/or appointment data).

In one embodiment of the invention, the process associated with determining whether the credential data is valid involves converting each transaction to input usable by the rule engine. A collective set of rule engine input may then be provided to the system to perform validation. In one embodiment of the invention, the process of determining whether the transaction input is valid involves determining the set of rules that apply to the input by filtering the rules using a set of preconditions.

The set of tests may then be partitioned by test type and each test type is associated with the transaction input. Once the association occurs a candidate for each test type is selected and a collective group of all tests of a particular type is formulated for input. The tests are then provided to the system for processing. The results can be stored in cache for later use by the system. For each rule associated with each input, the system determines if the test conditions are met. If the test conditions are met, the transaction data with respect to that test type is considered valid. The system may use the cached results to determine if the test conditions are met. The results indicate which of the transactions are valid and can therefore be utilized to determine which sales agents to compensation for a particular transaction.

The methodology for collectively submitting credential checks to the system for processing in accordance with one embodiment of the invention is described in further detail below (see e.g., Section entitled License and Appointments Validation).

Introduction to Licenses and Appointments

So that the reader gains an understanding of the type of credential information that may be validated by embodiments of the invention, a brief description of credentials such as licenses and/or appointments follows. Licenses within an embodiment of the invention may equate to physical licenses issued by jurisdictions (e.g., federal, state/province). To receive compensation for a sale, the system ensures that distributors are appropriately licensed and that each individual who receives compensation is appointed to make such sales (e.g., an agent).

The system may also determine whether parties associated with the transaction (e.g., distributors and/or sales representatives) have an up to date and valid credential (e.g., license). For example, the system may keep track of continuing education credits to determine how many courses a distributor has taken. The system may use the continuing education credits to determine if a distributor meets credential (e.g., appointment and/or license) requirements. An institution is typically required when defining appointment types. Like individuals, institutions may be represented in the system as parties, agents, sales representatives or distributors. The system may also require a regulatory jurisdiction when defining certain credential types. An embodiment of the invention comprises a mechanism for specifying credential information and defining the rules that govern credentials (e.g., licenses) held by parties. FIG. 1 provides an example of some of the decisions that may be made when checking the validity of credentials such as licenses or appointments. For example, the user may specify rules that define one or more of the following types of credential (e.g., license) information:

1. The educational credits required in order to hold a specific type of credential (e.g., step 102). For example, License L requires X units of education credit C.
2. The renewal requirements for a specific type of credential (e.g., step 104). For example, License L must be renewed every T units of time.
3. The residency rules associated with a specific type of credential (e.g., step 106). For example, License L is required in jurisdiction J. The user may associate credential types with product types and a jurisdiction through credential entries in a distributor's credential record. The record may include <credential type, product, and jurisdiction>. Access to the credential rules through the distributor credential record enables the user to define information relating to the following questions, while factoring in such elements as the type of product to be sold or the state in which it will be sold:
   a. Is a distributor qualified to hold a credential (for instance, does the distributor have sufficient educational credits)?
   b. Does the distributor have the right credential to sell (e.g., step 100), Credentials, Jurisdiction, Education Credits, Products service, or illustrate a product?

Does the distributor have a credential that will expire (e.g., step 108) within a specified period of time? If any of the above conditions indicates the transaction is not valid, the system executes step 110 where it may stop execution of the transaction relating to the invalid credential. Thus, the sales representative may not receive any compensation for invalid transactions. The system's credentialing mechanism may be utilized to define credential parameters relating to any party in the system (e.g., institutions, distributors, sales representatives, agents, etc. . . . ).

An embodiment of the invention also provides a mechanism for identifying and defining the rules that govern appointments held by parties. For example, the user may specify rules that define one or more of the following types of information:

1. Does a specific appointment require a certain license (e.g., step 112)? For example, Appointment A requires license L.

2. Does an appointment require errors and omissions (E & O) coverage (e.g., step 114)? For example, Appointment A requires E&O coverage by Distributor D.
3. What are the renewal requirements for a specific type of appointment (e.g., step 116)? For example, Appointment A must be renewed every T units of time.
4. What are the residency rules associated with a specific type of appointment (e.g., step 118)? For example, Appointment A is required in jurisdiction J. The association of an appointment type with a product type, a jurisdiction, and an institution is made in the appointment record associated with a distributor. The record specifies <appointment type, product, jurisdiction, and institution>. The user can access the appointment rules through the distributor license record. These rules enable the user to determine outcomes associated with the following questions, while factoring in such elements as the type of product to be sold or the state in which the product will be sold:
   a. Is a distributor qualified to hold an appointment? For example, do does the distributor have sufficient E&O coverage?
   b. Does the distributor have the right appointment to sell a product?
   c. Does the distributor have an appointment that will expire within a specified period (e.g., step 120)?
   d. What are the cancellation rules associated with an appointment? The set of appointment rules of the system software can be Appointments, Licenses, Products, Jurisdiction If any of the above conditions indicate the appointment if not valid, the system may execute step 126 where it stops execution of the transaction relating to the invalid appointment. If the conditions are met, the system executes step 122, where it flags the transaction being processed as valid and passes the transaction data to commission engine for processing.

Transaction Processing Overview

Once the credential information (e.g., licensing and appointment data) is defined. The system may be configured to process transaction data associated with the sale of different products. The system may be configured to ensure that the terms of a selling agreement (e.g., an agreement between the parties involved) are followed and that the credential (e.g., licensing and/or appointment or other agreed upon constraints) requirements are not violated with respect to each transaction executed by the system. Sales transaction data comprises the information associated with the sale of one or more products. The system is configured to process one or more transactions at a time and may perform transaction processing collectively (e.g., in batch) if such processing is desirable. However, the invention also contemplates other forms of transaction processing and may, for example, process each transaction entered into the system when it is entered.

In an embodiment of the invention, the system converts the transaction data into a form that can be processed by the system. For example, the transaction data may be loaded into an object model configured to interface with the system embodying one or more aspects of the invention. The transaction data may indicate which party sold what to whom and identify the appropriate agreements associated with the sale. For example in accordance with one embodiment of the invention, the transaction data identifies which distributor was responsible for the sale and what agreement that distributor is operating under. The system resolves the associations contained in the transaction data and thereby determines the scope of analysis to be performed.

In an embodiment of the invention, the system also checks on credentials (e.g., licenses and/or appointments) for the distributor's supervisors. The system may require a license validation when appointments are processed. The logic associated with such processing in accordance with one embodiment of the invention performs the following steps:
1. Determines the credential (e.g., license and/or appointment) requirements for the distributor based on the values of the product, jurisdiction, and institution parameters passed to the function.
2. Determines whether the distributor possesses the required credential (e.g., license and/or appointment) types, or a blanket assignment. For example, some states do not permit a corporation to be licensed, but instead require them to have a blanket assignment. The rules evaluation used to determine the required license and/or appointments can also include other factors such as the compensation type (for example, the first year commission or renewal), the residency of the distributor, or the role of the distributor.

If the credential requirements are met, the system may perform commission processing. Otherwise an error results and the transaction associated with the error is not processed by the system.

In an embodiment of the invention, the system also identifies any other agreement objects affected by the input transaction. If the system locates an affected agreement object, it creates additional transactions that process compensation according to the newly identified agreement commission models. Once all input transactions have been associated with agreements, the system may invoke the commission engine and performs commission processing. However, the system may also enforce credentials and/or constraints independent of any agreement. For instance, companies may use the system to enforce an internal set of credential requirements, policies and/or constraints.

Commission processing involves determining the amounts to be paid to parties involved in the sales transaction. In one embodiment of the invention this occurs by processing the transaction based on rules defined by the selling agreement. However, the rules utilized by the system are not required to be defined in selling agreements. For example, the system may use rules defined in a manner independent of any selling agreement.

Distributor Data Object Model

Figure 2:
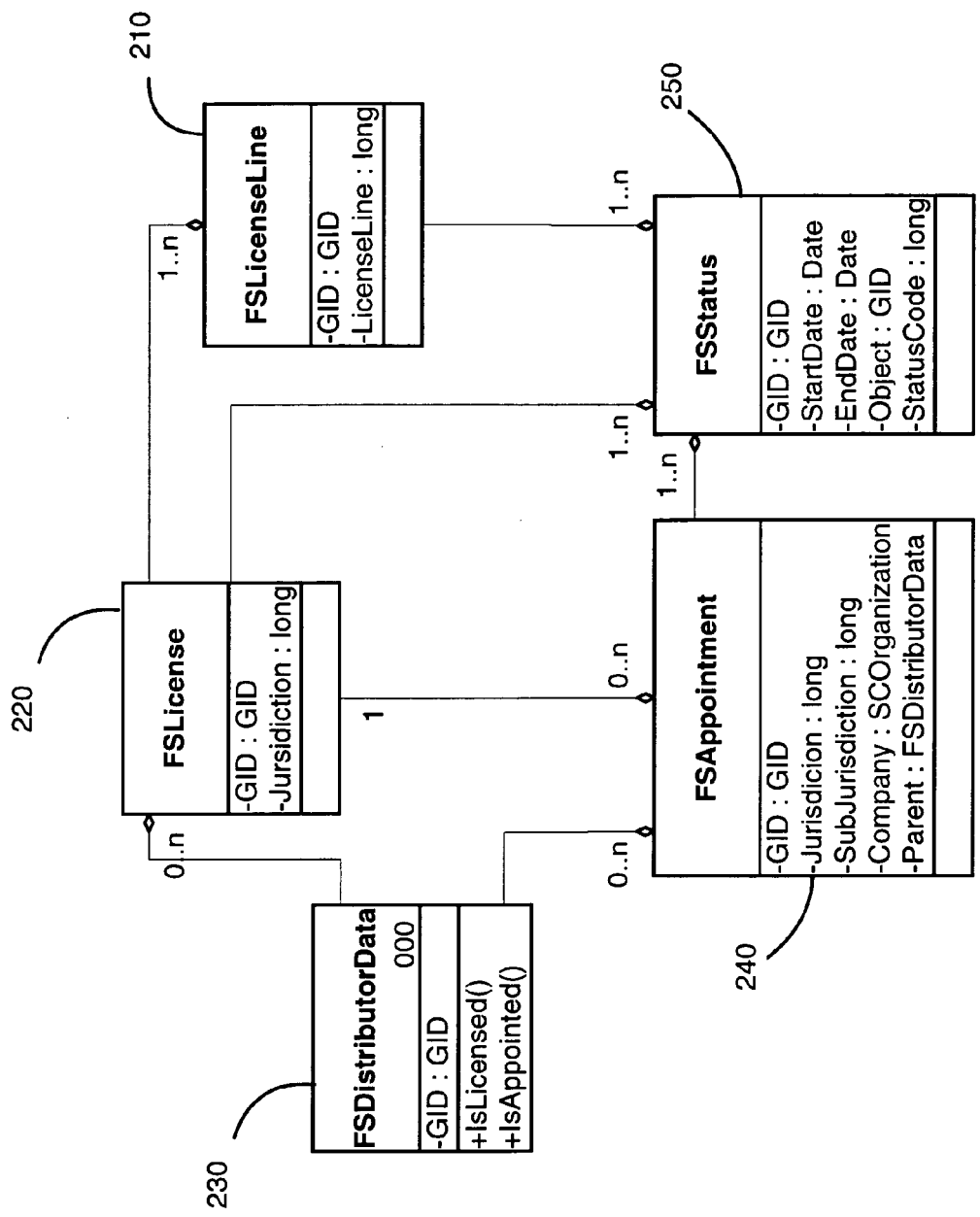
FIG. 2 shows a class diagram and relationships representing object models for licenses (e.g., credentials) in an embodiment of the invention.

FIG. 2 shows a class diagram and relationships representing object models for credentials (e.g., licenses) in an embodiment of the invention. The specific objects described herein are provided for illustrative purposes only and the reader should note that the invention also contemplates other software or hardware configurations that provide the functionality described herein. A distributor data object model 230 defines the data that is associated with a distributor and that is utilized to manage the Licensing and Appointments package. The distributor data object model has several properties comprising a SelfInsured property that may indicate if the distributor is self-insured. If not, then there may be associated FSEOPolicy objects. For example, the system may include a set of components (e.g., methods) configured to implement the following general functionality:

RecontractStatus may indicate whether or not an inactive distributor may enter into another contract (Valid only if IsActive( ) returns false);

RecontractReason may indicate why the distributor may not be re-contracted (if applicable, Valid recontract reason codes can be defined in XML or any other structured data format);

IsActive( ) which may indicate if the distributor is active, that it, has appointments still in effect;

IsAppointed( ) which may indicate if the distributor is properly credentialed (e.g., licensed and/or appointed) to receive credit for a transaction (Ensures that there is a valid credential such as an appointment and/or associated license for the date of the transaction). In one embodiment of the invention, the IsAppointed method evaluates whether a given party in a specific jurisdiction is legally capable of selling a specific product;

IsLicensed( ) which may indicate if the distributor is properly licensed (ensures that there is a valid credential (e.g., license) for the date of the transaction. The IsLicensed method evaluates whether a given party in a specific jurisdiction is legally permitted to sell a specific product;

IsBonded( ) which may indicate if the distributor is bonded (i.e., has an EOPolicy of type Bond Info);

HasGeneralLiability( ) which may indicates if the distributor has general liability insurance (i.e., has an EOPolicy of type General Liability Insurance);

getLicenses( ) which may return a collection of all FSLicense objects associated with the distributor;

getAppointments( ) which may return a collection of FSAppointment objects associated with the distributor;

getAllEOCoverages( ) which may return a collection of FSEOPolicy objects associated with the distributor;

getBackgroundChecks( ) which may denote a collection of FSBackgroundCheck objects associated with the distributor;

getCECredits( ) which may denote a collection of FSContinuingEducationCredit objects associated with the distributor;

getEOPolicies( ) which may return a collection of all FSEOPolicy objects of type Errors and Omissions Policy associated with the distributor;

getBondInfo( ) which may return a collection of all FSEOPolicy objects of type Bond Info associated with the distributor;

getGeneralLiability( ) which may return a collection of all FSEOPolicy objects of type General Liability Insurance associated with the distributor.

The names utilized to describe components, objects, and/or methods referred to above and throughout this description are for example only. The invention contemplates any component or set of components that implements the functionality described therein.

Licensing Object Models

In an embodiment of the invention, the system comprises a License class which represents a physical license issued to a distributor. The license class has several properties comprising a LicenseType denoting the type of license (for example, agent, broker, and so on). The license types may be defined in a structured file such as an XML file. The system may include the following components:

a LicenseClass denoting the class of license (for example, individual, corporate, partnership and may define the license classes in a structured file;

a LicenseNumber denoting the license number. This can be any alphanumeric string;

Jurisdiction denotes the jurisdiction (state/province) associated with the license. Jurisdiction codes are defined in a structured file such as XML;

The ResidentStatus may indicate whether the party associated with the appointment is a resident of the jurisdiction for which it is valid. The class may also include a LegalName denoting the legal name of the distributor as it appears on the license;

a DBAName denoting the "Doing Business As" name as it appears on the license;

a DistributorData denoting a backpointer to the FSDistributor Data;

a Terminate( ) to mark the license as being terminated;

a Renew( ) to renew the license for the specified period;

a getLicenseLines( ) providing a helper function that returns a collection of FSRequests associated with this FSLicense;

a getRequests( ) providing a helper function that returns a collection of FSRequests associated with this FSLicense; LicenseLine 210 class may represent the line of insurance covered by particular license. Licenseline 210 class has several properties comprising a LicenseLine denoting the line of authority for the license;

a License denoting the associated FSLicenseDocumentation;

a Terminate to mark the license line as being terminated;

a Renew to renew the license line for the specified period;

one or more LicenseLine classes may be instantiated by a License class 220.

a License 220 class may represent a physical license issued to a distributor. The license class 220 can have several methods and properties comprising:

a LicenseType, a LicenseClass, a LicenseNumber, a Jurisdiction, ResidentStatus and a LegalName. LicenseType may designate the type of license (for example, agent, broker, and so on).

LicenseClass designates the class of license (for example, individual, corporate, partnership).

LicenseNumber designates the license number. Jurisdiction designates the jurisdiction (state/province) associated with the license (Jurisdiction codes may be defined in an XML format).

ResidentStatus indicates whether the party associated with the appointment is a resident of the jurisdiction for which it is valid.

LegalName designates the legal name of the distributor as it appears on the license. A helper function that returns a collection of requests associated with this License 220. In an embodiment of the invention, one or more instances of the License 220 class may be associated with a status class 1050 and an appointment class 240.

Appointment Object Model

In an embodiment of the invention, an appointment class 240 encapsulates the data associated with an appointment (e.g., a type of credential). The appointment object model may comprises the following:

a License denoting the License associated with this appointment;

a Jurisdiction denoting the jurisdiction (state/province) associated with the appointment (The jurisdiction is determined by the licenses associated with the appointment. It is provided on the appointment for convenience. Jurisdiction codes can be defined in XML format or some other format.);

a SubJurisdiction denoting the sub-jurisdiction (county) associated with the appointment (This field is only applicable for certain jurisdictions. Sub-jurisdiction codes are defined in an XML format);

a Company denoting the financial services company for which the appointment is being issued;

a ResidentStatus indicating whether the party associated with the appointment is a resident of the jurisdiction for which it is valid; a Parent indicating the distributor firm from which the blanket appointment comes;

a Distributor Data denoting a backpointer to the FSDistributorData.

License and Appointments Validation

Figure 3:
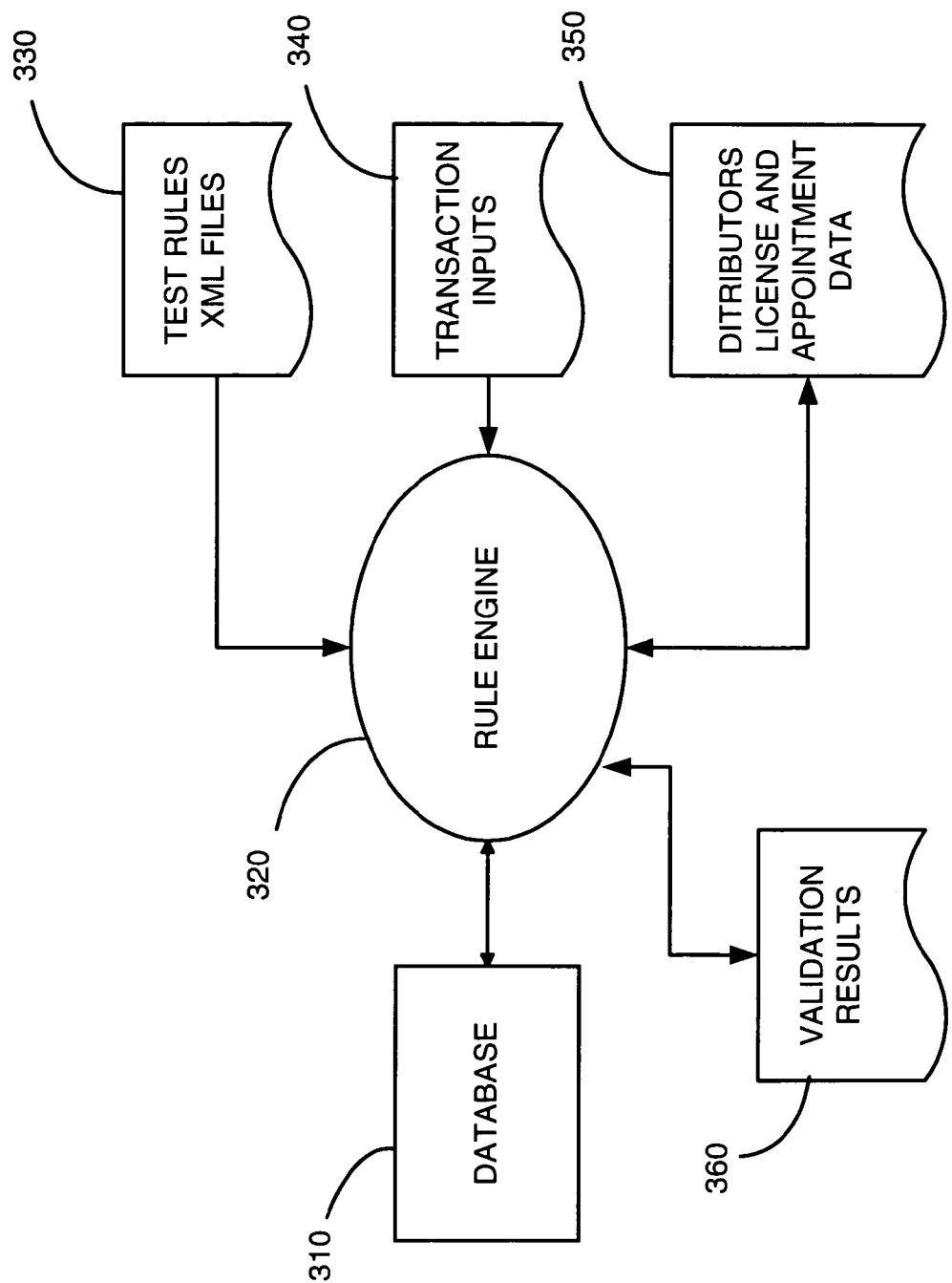
FIG. 3 shows a block diagram illustrating data communication during credential validation process in an embodiment of the invention.

FIG. 3 shows a block diagram illustrating data communication during the credential (e.g., license) validation process in accordance with an embodiment of the invention. When one or more transaction inputs 340 are received, the rule engine 320 queries the database to retrieve data related to the sales party involved in the transaction. The rule engine may load test rule 330 files. Test rule files are designed by users to specify tests to be carried out on the transaction data. Test rules can be stored in files using a standardized format (e.g. XML files, text, or any other type of structured data file). The rule engine also loads the distributors' credential information such as the license and/or appointment data 350. Once the rule engine validates the credential information associated with the transaction against the test rules, it may store the results in one or more validation results files 360. The transaction data may then be updated with the validated credential information and returned to update the database.

In an embodiment of the invention, the system is configured to process one or more transactions at a time and may perform transaction processing collectively if such processing is desirable. The system configured in accordance with an embodiment of the invention may be composed of several entities allowing for performing one or more steps of the transaction data processing. An entity such as the commission engine may determine the arrangement of input such that validation can be performed more efficiently (e.g., collectively). The commission engine or some other component may ready the data for processing during an initialization process. The system may implement a rule engine, capable of determining the set of tests that need be validated. For example, the RuleSet class and a set of associated objects reachable from that class (e.g., preconditions, test, etc. . . . ) may provide the functionality referred to as the rule engine. Thus, the rule engine may comprise a collection of objects working together.

The rule engine is capable of arranging the input to be passed along to an associated test part (e.g., iTestPart) and the compensation engine (e.g., part of the DMS system) runs an initialization step where data can be denormalized. The system can then pass off the data to a representative instance of an object containing the set of tests (e.g., iTtestPart). The tests may comprise an interface that supports the ability to perform batch validation for all other instances of tests given that they contain input data. In one embodiment of the invention, the ruleset comprises a list of rules for testing input to determine if data satisfies the requirements. The rules evaluate distributor's data (information about distributors, products, and so on) determining if it meets requirements (or preconditions) for the system rules. For example, the APPOINTMENT_TEST in the Appointment Rule may evaluate whether a particular distributor has the appointments necessary to sell a product in a particular jurisdiction. The rule engine can determine whether compensation should be paid and whether or not a particular distributor is eligible to sell a particular product.

The system may contain a set of defined rule sets. If the data satisfies the requirements, the rule is set considered. Each rule is made of one or more elements including:

A precondition—Defines circumstances under which the rule applies. If the precondition is not satisfied, the rule does not apply.

A test—A Boolean expression that determines if the rule is satisfied.

An explanation—An optional message that explains the rule failure.

In an embodiment of the invention, preconditions to a rule comprise a list of either generic preconditions or specialized preconditions (for example, a rule may apply to a particular product or jurisdiction) designed to cover common cases. A product precondition may be satisfied if the input refers to a given product specified in the precondition. This precondition can map to an object (SCCMProduct.Name).

A product class precondition may be satisfied if the input refers to a product that has the class specified in the precondition. This precondition maps to SCCMProduct.ProductClass. In an embodiment of the invention, a jurisdiction set precondition is satisfied if the input refers to one of a set of jurisdictions specified in the precondition.

A jurisdiction precondition may be satisfied if the input refers to a jurisdiction specified in the precondition. A start date precondition may be satisfied if the date of the input is later than or equal to the date specified.

An end date precondition is satisfied if the date of the input is earlier than the date specified.

A generic precondition is useful when more specific preconditions are inadequate. It is satisfied if the specified property on the specified input object has the specified value.

In an embodiment of the invention, all transactions are required to pass however other requirements may be set. Tests can be further combined using standard Boolean operators AND, OR, and NOT.

The license line test may be satisfied if the distributor referred to by the input has the specified license line in the specified jurisdiction. For example: does John Smith have a Series 66 license for California?

The appointment test may be satisfied if the distributor referred to by the input has the specified appointment in the specified jurisdiction. For example: is John appointed for Variable Life in New York?

The background check test may be satisfied if the distributor referred to by the input has passed the specified background check with the specified decision.

The errors and omissions test may be satisfied if the distributor referred to by the input has the specified level of errors and omissions coverage.

The liability test may be satisfied if the distributor referred to by the input has the specified level of liability coverage.

The continuing education test may be satisfied if the distributor referred to by the input has the specified number of continuing education credit hours.

A generic test is useful when more specific tests are inadequate. It is satisfied if the specified property on the specified input object has the specified value.

Figure 4:
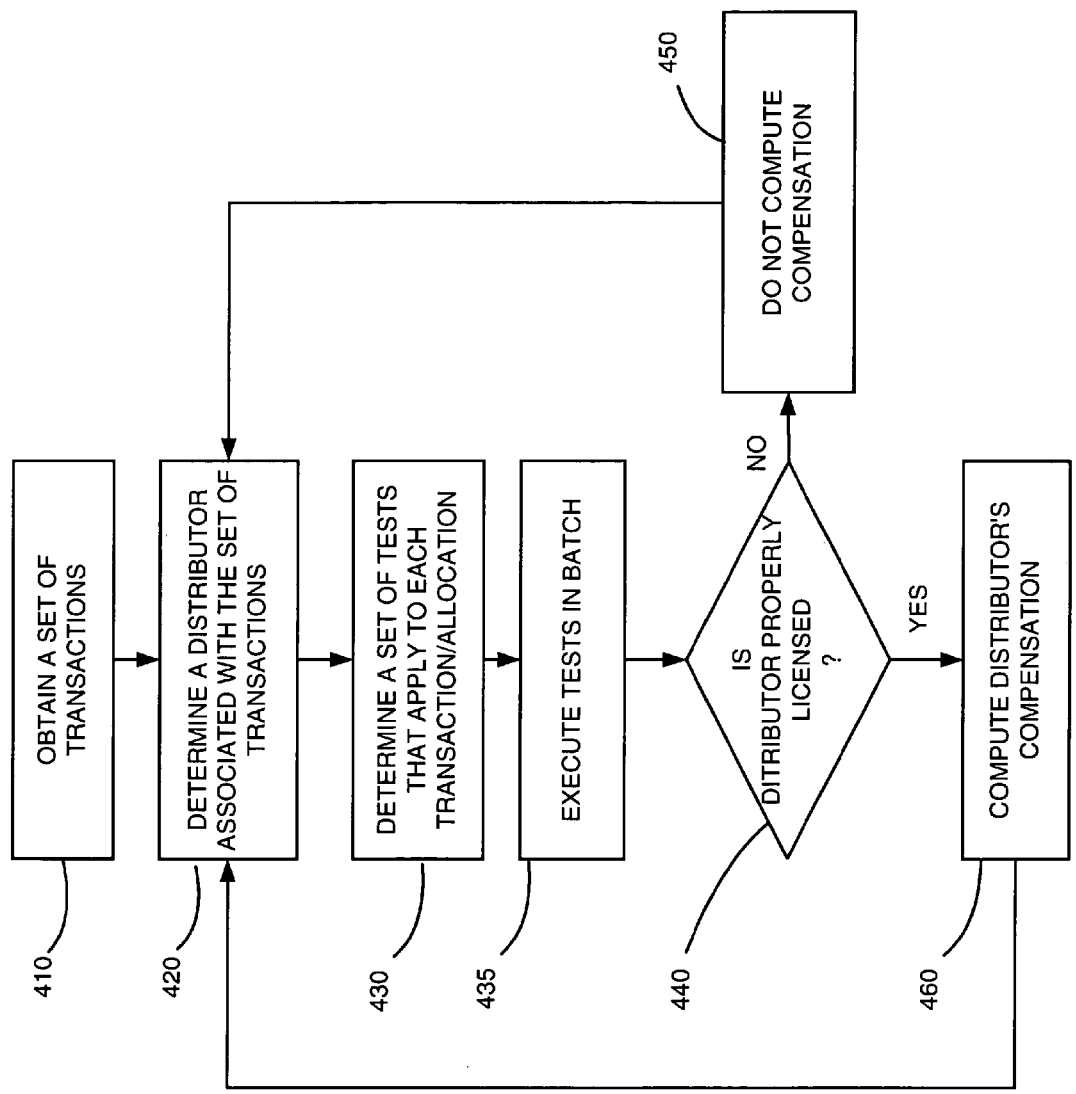
FIG. 4 shows a flowchart illustrating the steps involved in validating distributors credentials in an embodiment of the invention.

FIG. 4 shows a flowchart illustrating the steps involved in validating credential data in accordance with an embodiment of the invention. Transaction data is received by the system in 410. Step 410 involves access to the system automatically or manually by users through one or more means for interfacing the system with users (e.g. Web interface, API) described above. The system can determine in 420 the set of distributors associated with the transaction. The system then determines a set of tests to be performed for each transaction or allocation in 430. The system executes the set of tests in batch in 435. The system tests whether each distributor is properly licensed for of the transactions processed in 440. If the distributor's credentials satisfy the tests, the distributor's data is appointed for the transaction in 460 (e.g., the distributor is compensated). If a distributor's license does not satisfy the test rules in 440 then the distributor is dismissed from the current transaction in 450 (e.g., no compensation is credited), and the next distributor on the list of distributors involved in the transaction is selected for further license and appointments testing. Upon completion of the evaluation, the process may iterate back to step 410 or 440.

In an embodiment of the invention, a distributor may be considered as appropriately credentialed for a transaction if for example, on a given date, the distributor has a credentials (e.g., a license) that is valid for the jurisdiction in which the transaction occurred. The code below (in Object Query Language, OQL) performs an example of a license check against the data as stored in the database, according to the object model described above:

```
SELECT      ll
FROM FSLicenseLine ll,
     FSLicense lic,
     FSStatus licStatus,
     FSStatus llStatus
WHERE       ll.LicenseLine   =    [License Line]
AND ll.License    =    lic
AND lic.DistributorData =    [Distributor GID]
AND         lic.Jurisdiction  =    [Jurisdiction]
AND         licStatus.Object  =    lic
AND         llStatus.Object   =    ll
AND         (licStatus.StartDate <=   [Transaction Date]
AND         licStatus.EndDate  >    [Transaction Date]
AND         (llStatus.StartDate <=   [Transaction Date]
AND         llStatus.EndDate   >    [Transaction Date]
AND         lic.StatusCode    NOT IN  (<List of Invalid
                                       Statuses>)
AND         ll.StatusCode     NOT IN  (<List of Invalid
                                       Statuses>)
```

A non-empty result set indicates that the distributor is properly licensed. As the above OQL indicates, a join is required across four (4) logical tables. This method however is costly in terms of processing time. Since the query performs joins on several tables, utilizing database table indexing functionality may increase the speed. With this method the cost of determining if a distributor is licensed can be significant, especially given the number of rows that will be in the tables, and especially the table associated with FSStatus.

Distributor credential validation may be performed in steps wherein each step yields only a subset of data to be processed resulting in a faster search and thus faster processing.

Figure 5:
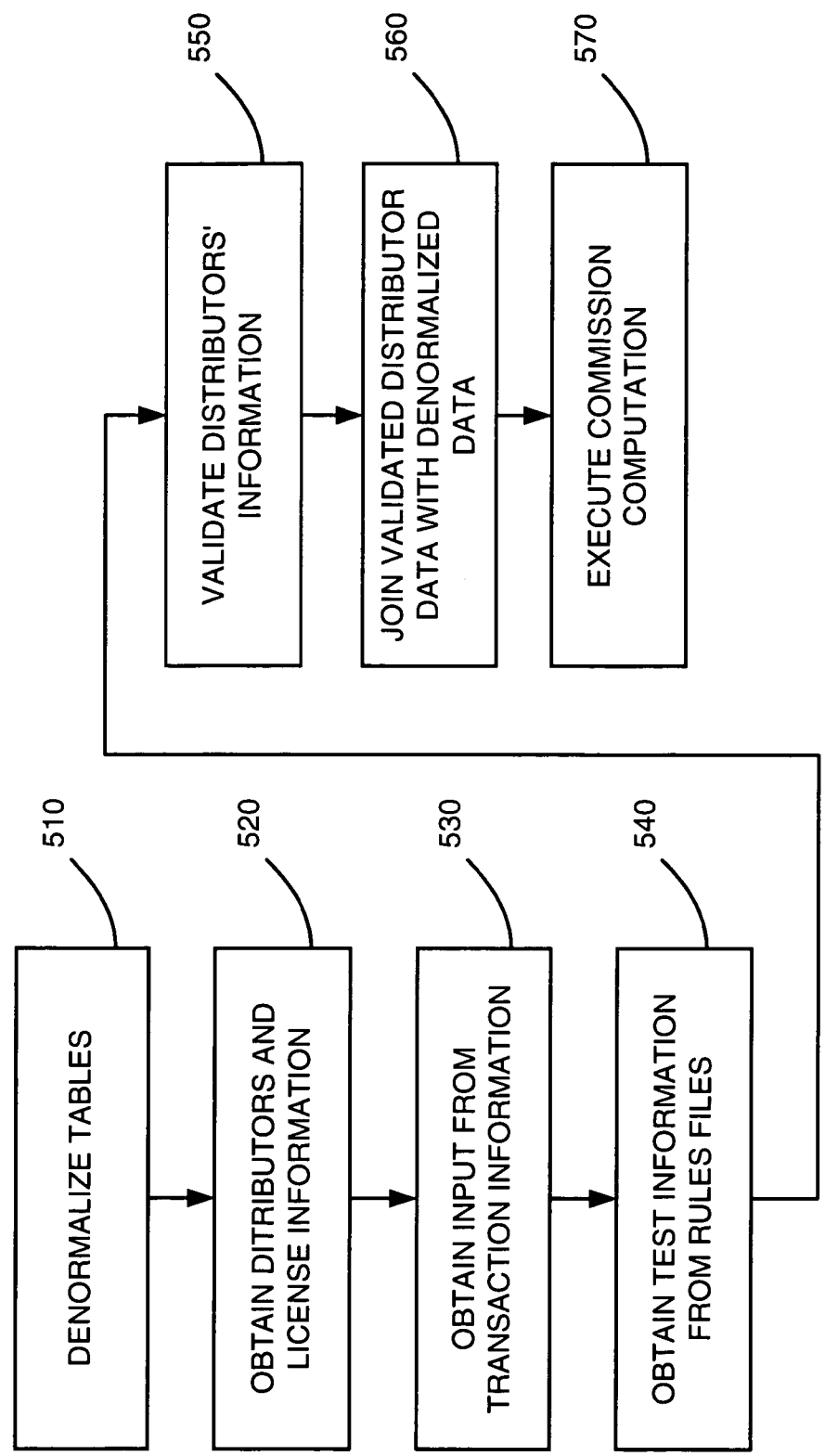
FIG. 5 shows a flowchart illustrating the steps involved in validating credential using an alternative approach to credential validation in an embodiment of the invention.

FIG. 5 comprises a flowchart illustrating the steps involved in validating credentials such as licenses using an alternative approach to credential validation in an embodiment of the invention. Data processing starts with the denormalization of the data from several tables to be input into a denormalized table in 510. The system obtains a distributor's credential information in 520. The system obtains the transaction information in 530. The system obtains test rules information in 540 and then checks for credential (e.g., license) validity based on distributor's information, transaction information and credential information in 550. The system then joins the results of the validation of distributor's licenses with the denormalized data.

A sample Object Query Language (OQL) code performing this check against the data as stored according to the object model described above is as follows:

```
SELECT      app.Parent
FROM        FSLicenseLine ll,
     FSLicense lic,
     FSAppointment app,
```

-continued

```
     FSStatus appStatus,
     FSStatus licStatus,
     FSStatus llStatus
WHERE       ll.LicenseLine   =    [License Line]
AND         ll.License       =    lic
AND         app.License      =    lic
AND         app.LicenseLines =    ll
AND         app.DistributorData =    [Distributor GID]
AND         app.Jurisdiction =    [Jurisdiction]
AND         ( app.SubJurisdiction =    [Sub-Jurisdiction]
             OR app.SubJurisdiction =    -1       )
AND         appStatus.Object =    app
AND         licStatus.Object =    lic
AND         llStatus.Object  =    ll
AND         (appStatus.StartDate <=   [Transaction Date]
AND         appStatus.EndDate  >    [Transaction Date]
AND         (licStatus.StartDate <=   [Transaction Date]
AND         licStatus.EndDate  >    [Transaction Date]
AND         (llStatus.StartDate <=   [Transaction Date]
AND         llStatus.EndDate   >    [Transaction Date]
AND         app.StatusCode NOT IN (<List of Invalid Statuses>)
AND         lic.StatusCode NOT IN (<List of Invalid Statuses>)
AND         ll.StatusCode NOT IN (<List of Invalid Statuses>)
```

A non-empty result set indicates that the distributor is appointed.

The system may perform credential checks when running a compensation engine. The reader should note, however, that such credential checks may be performed at other times and by other engines or components. The process of validating distributors' credentials can be referred to in an embodiment of the invention as the the license check phase. The compensation engine may be run on a periodic basis to calculate compensation for new sales transactions since the most recent run of the engine. A transaction will result in multiple allocations. If any of these allocations are associated with the sale of any products that require the distributor be credential (e.g., licensed or appointed) then the allocation passes through the license check phase. The number of transactions and allocations that are processed in any given run varies per deployment, ranging from tens of thousands to several million. Thus the performance of the credential check phase may affect performance of the entire system.

An embodiment of the invention ensures that credential validation can be efficiently performed. First, the system denormalizes the credential information (e.g., license and appointment data) into separate tables. To determine if a distributor is appropriately credentialed, the system may perform a query against a single table. In one embodiment of the invention, a single SELECT statement (with the exception of blanket appointments, which result in as many queries as the depth of the blanket appointment) can be utilized to query the database. The invention also contemplates other queries. To further ensure the performance of the credential check phase, the system is enabled to collectively perform license and appointment checks (also referred to herein as credential checks). In an embodiment of the invention, the size of the collection of data to be submitted (e.g., a batch) is determined by the commission engine's batch size. In an embodiment of the invention, the collection size is in the range of five thousand to ten thousand items. However, the size of the batch submitted may vary depending upon the capacity of the system. To perform the query collectively, the system inputs the selection criteria in an input table as a single INSERT statement. Then, the system performs a single join from the input table against the denormalized data table. In the case of blanket appointments, subsequent queries of inherited appointments can be collectively batched as well.

For example, to validate 100,000 allocations while verifying only licenses, the original query would have resulted in 100,000 queries, each requiring a four-table join. Not only is this extremely costly in terms of database performance, but it also results in 100,000 network round trips to communicate with the database. In the same example, using the method proposed in the invention, there is an initial cost to denormalize the license table. However, this operation needs to be performed only once at the beginning of the engine run. Once the data is denormalized, the system may use the collective processing technique described herein. Thus, for each collection of data (e.g., a batch of 5,000), the system requires only two network round-trips: one to insert the criteria into the input table, and one to perform a join of the input table against the denormalized data table. Considering the batched INSERT as a single statement, to validate the 100,000 allocations, the system incurs only the cost of 40 network round-trips, and 40 queries, plus the cost of the initial denormalization.

An embodiment of the invention is configured to interface with a Distributor Management System (DMS). An example of such a DMS system can be found in the co-pending application (U.S. Ser. No. 09/810,514) entitled "Method and System for Managing Distributor Information", the specification of which is incorporated herein by reference.

Thus, a method and apparatus for collectively processing credential information is described. Particular embodiments described herein are illustrative only and should not limit the present invention thereby. The claims and their full scope of equivalents define the invention.

What is claimed is:

1. An apparatus for collectively performing validation of credential information, the apparatus comprising:
a processor of a computer system; and
a memory, coupled to the processor, having code stored therein and executable by the processor to configure the computer system into a machine for;
obtaining a set of available credential information of each of the one or more product distributors associated with the one or more product distribution transactions;
storing the set of credential information, wherein the credential information is stored in a form that can be processed by the processor;
loading from at least one data source a set of credential validation rule data;
obtaining the one or more product distribution transactions associated with the one or more product distributors one;
processing the one or more product distribution transactions and the credential validation rule data to validate the obtained one or more product distribution transactions associated with the one or more product distributors in accordance with predetermined validation criteria to determine if the one or more transactions can be used for compensating one or more product distributors, to validate the obtained credential information of one or more product distributors associated with one or more transactions to determine whether the one or more product distributors meet eligibility requirements for compensation associated with each of the obtained product distribution transactions for the one or more product distributors, and to generate results data representing at least any validated transactions and determined-eligible product distributors; and
generating compensation data from the results data for each of the one or more product distributors to be compensated for the one or more product distribution transactions.

2. The apparatus of claim 1 wherein the code for obtaining said set of available credential information further is further executable by the processor for denormalizing data from a plurality of database tables.

3. The apparatus of claim 1 wherein the code for loading from at least one data source said set of credential validation rule data is further executable by the processor for loading said set of rule data from a standard format data file.

4. The apparatus of claim 3 wherein the code for loading said set of rule data from standard format data file is further executable by the processor for parsing data from a file having an Extensible Markup Language (XML) format.

5. The apparatus of claim 3 wherein said data file further comprises a data file having an Extensible Markup Language (XML) format.

6. The apparatus of claim 1 wherein the code for processing the rule data is further executable by the processor for:
determining a set of rules associated with said collective group by using a set of preconditions to filter among a plurality of rules, said rule data comprising at least one test having an associated type;
partitioning said set of rules based on said type of said at least one test associated with said set of rules;
preparing said collective group wherein said collective group comprises tests associated with said test type; and
determining for said set of rule data whether said at least one test associated with said set of rules are valid.

7. The apparatus of claim 6 wherein the set of preconditions comprises at least one member of the group comprising:
a product class precondition;
a jurisdiction precondition; and
an end date precondition.

8. The apparatus of claim 1 wherein the compensation data represents an amount of compensation for each of the one or more product distributors to be compensated for the one or more product distribution transactions, the code is further executable by the processor for:
computing the amount of compensation for each of the one or more product distributors to be compensated.

9. The apparatus of claim 8 wherein compensation comprises a commission.

10. The apparatus of claim 1 wherein the code is further executable by the processor for:
obtaining the set of available credential information for at least one of the distributors from two or more tables;
denormalizing said set of available credential information from said two or more tables into a denormalized database table;
wherein the rule data comprises a set of test conditions data from at least one data source; and
processing in the computer system the rule data comprises applying a credential test by querying said denormalized table with said set of test conditions data.

11. The apparatus of claim 10 wherein the code for denormalizing said set of credential information is further executable by the processor for creating one or more database tables.

12. The apparatus of claim 10 wherein the code for denormalizing said set of credential information is further executable by the processor for joining at least two database tables into at least one database table.

13. The apparatus of claim 10 wherein the code is further executable by the processor for:
defining the rule data.

14. The apparatus of claim 13 wherein the code is further executable by the processor for storing said rule data into a database table.

15. The apparatus of claim 10 wherein the code for applying a credential test is further executable by the processor for joining said set of test conditions data with said denormalized database table.

16. The apparatus of claim 1 wherein the code for obtaining a set of available credential information is further executable by the processor for using database connections.

17. The apparatus of claim 1 wherein the code is further executable by the processor for:
obtaining the rule data from a data file.

18. The apparatus of claim 1 wherein the product distribution transactions comprises data related to sales of a product.

19. The apparatus of claim 1 wherein the one or more product distributors comprise one or more members of the group consisting of sales agents, sales representatives, supervisors of the sales agents, and supervisors of the sales representatives.

20. The apparatus of claim 1 wherein:
the rule data comprises credential information identifying regulatory constraints for each of the obtained sales transactions placed on at least one of the one or more distributors associated with said obtained sales transaction; and
the code for processing in the computer system the rule data to validate the obtained credential information is further executable by the processor for determining if said credential information obtained sales transactions placed on at least one of the one or more distributors conforms to said regulatory constraints.

21. The apparatus of claim 1 wherein predetermined validation criteria comprises at least one member of the group consisting of:
required educational credits;
required licenses;
required level of liability coverage;
license renewal requirements;
background check; and
residency rules.

22. The apparatus of claim 1 wherein the code for processing in the computer system the rule data is further executable by the processor for processing the rule data for multiple product distribution transactions comprises batch processing the rule data for multiple product distribution transactions for batches of product distribution transactions.

23. A tangible, non-transitory computer readable medium comprising code stored therein and executable by a processor of a computer system to configure the computer system into a machine for:
obtaining a set of available credential information of each of the one or more product distributors associated with the one or more product distribution transactions;
storing the set of credential information, wherein the credential information is stored in a form that can be processed by the processor;
loading from at least one data source a set of credential validation rule data;
obtaining-the one or more product distribution transactions associated with the one or more product distributors one;
processing the one or more product distribution transactions and the credential validation rule data to validate the obtained one or more product distribution transactions associated with the one or more product distributors in accordance with predetermined validation criteria to determine if the one or more transactions can be used for compensating one or more product distributors, to validate the obtained credential information of one or more product distributors associated with one or more transactions to determine whether the one or more product distributors meet eligibility requirements for compensation associated with each of the obtained product distribution transactions for the one or more product distributors, and to generate results data representing at least any validated transactions and determined-eligible product distributors; and
generating compensation data from the results data for each of the one or more product distributers to be compensated for the one or more product distribution transactions.

24. The apparatus of claim 23 wherein the code for obtaining said set of available credential information further is further executable by the processor for denormalizing data from a plurality of database tables.

25. The apparatus of claim 23 wherein the code for loading from at least one data source said set of credential validation rule data is further executable by the processor for loading said set of rule data from a standard format data file.

26. The apparatus of claim 25 wherein the code for loading said set of rule data from standard format data file is further executable by the processor for parsing data from a file having an Extensible Markup Language (XML) format.

27. The apparatus of claim 25 wherein said data file further comprises a data file having an Extensible Markup Language (XML) format.

28. The apparatus of claim 23 wherein the code for processing the rule data is further executable by the processor for:
determining a set of rules associated with said collective group by using a set of preconditions to filter among a plurality of rules, said rule data comprising at least one test having an associated type;
partitioning said set of rules based on said type of said at least one test associated with said set of rules;
preparing said collective group wherein said collective group comprises tests associated with said test type; and
determining for said set of rule data whether said at least one test associated with said set of rules are valid.

29. The apparatus of claim 28 wherein the set of preconditions comprises at least one member of the group comprising:
a product class precondition;
a jurisdiction precondition; and
an end date precondition.

30. The apparatus of claim 23 wherein the compensation data represents an amount of compensation for each of the one or more product distributers to be compensated for the one or more product distribution transactions, the code is further executable by the processor for:
computing the amount of compensation for each of the one or more product distributors to be compensated.

31. The apparatus of claim 8 wherein compensation comprises a commission.

32. The apparatus of claim 23 wherein the code is further executable by the processor for:
obtaining the set of available credential information for at least one of the distributors from two or more tables;
denormalizing said set of available credential information from said two or more tables into a denormalized database table;
wherein the rule data comprises a set of test conditions data from at least one data source; and processing in the computer system the rule data comprises applying a credential test by querying said denormalized table with said set of test conditions data.

33. The apparatus of claim 32 wherein the code for denormalizing said set of credential information is further executable by the processor for creating one or more database tables.

34. The apparatus of claim 32 wherein the code for denormalizing said set of credential information is further executable by the processor for joining at least two database tables into at least one database table.

35. The apparatus of claim 32 wherein the code is further executable by the processor for:
defining the rule data.

36. The apparatus of claim 35 wherein the code is further executable by the processor for storing said rule data into a database table.

37. The apparatus of claim 32 wherein the code for applying a credential test is further executable by the processor for joining said set of test conditions data with said denormalized database table.

38. The apparatus of claim 23 wherein the code for obtaining a set of available credential information is further executable by the processor for using database connections.

39. The apparatus of claim 23 wherein the code is further executable by the processor for:
obtaining the rule data from a data file.

40. The apparatus of claim 23 wherein the product distribution transactions comprises data related to sales of a product.

41. The apparatus of claim 23 wherein the one or more product distributors comprise one or more members of the group consisting of sales agents, sales representatives, supervisors of the sales agents, and supervisors of the sales representatives.

42. The apparatus of claim 23 wherein:
the rule data comprises credential information identifying regulatory constraints for each of the obtained sales transactions placed on at least one of the one or more distributors associated with said obtained sales transaction; and
the code for processing in the computer system the rule data to validate the obtained credential information is further executable by the processor for determining if said credential information obtained sales transactions placed on at least one of the one or more distributors conforms to said regulatory constraints.

43. The apparatus of claim 23 wherein predetermined validation criteria comprises at least one member of the group consisting of:
required educational credits;
required licenses;
required level of liability coverage;
license renewal requirements;
background check; and
residency rules.

44. The apparatus of claim 23 wherein the code for processing in the computer system the rule data is further executable by the processor for processing the rule data for multiple product distribution transactions comprises batch processing the rule data for multiple product distribution transactions for batches of product distribution transactions.

45. An apparatus comprising:
means for obtaining a set of available credential information of each of the one or more product distributors associated with the one or more product distribution transactions;
means for storing the set of credential information, wherein the credential information is stored in a form that can be processed by the processor;
means for loading from at least one data source a set of credential validation rule data;
means for obtaining-the one or more product distribution transactions associated with the one or more product distributors one;
means for processing the one or more product distribution transactions and the credential validation rule data to validate the obtained one or more product distribution transactions associated with the one or more product distributors in accordance with predetermined validation criteria to determine if the one or more transactions can be used for compensating one or more product distributors, to validate the obtained credential information of one or more product distributors associated with one or more transactions to determine whether the one or more product distributors meet eligibility requirements for compensation associated with each of the obtained product distribution transactions for the one or more product distributors, and to generate results data representing at least any validated transactions and determined-eligible product distributors; and
means for generating compensation data from the results data for each of the one or more product distributers to be compensated for the one or more product distribution transactions.

* * * * *